(12) United States Patent
Sharma et al.

(10) Patent No.: US 9,575,878 B2
(45) Date of Patent: Feb. 21, 2017

(54) DATA-DRIVEN TESTING WITHOUT DATA CONFIGURATION

(75) Inventors: Neeraj S. Sharma, Delhi (IN); Abhishek Yadav, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1188 days.

(21) Appl. No.: 12/404,709

(22) Filed: Mar. 16, 2009

(65) Prior Publication Data
US 2010/0235816 A1    Sep. 16, 2010

(51) Int. Cl.
G06F 9/44       (2006.01)
G06F 11/36      (2006.01)
G06F 11/00      (2006.01)

(52) U.S. Cl.
CPC ............. G06F 11/3696 (2013.01); G06F 8/71 (2013.01); G06F 11/368 (2013.01); G06F 11/3692 (2013.01)

(58) Field of Classification Search
CPC ............. G06F 11/3696; G06F 11/3684; G06F 11/3688; G06F 11/368
See application file for complete search history.

(56) References Cited

U.S. PATENT DOCUMENTS

| | | | |
|---|---|---|---|
| 4,696,003 A * | 9/1987 | Kerr et al. | 714/38.14 |
| 5,157,782 A * | 10/1992 | Tuttle et al. | 714/45 |
| 5,233,611 A * | 8/1993 | Triantafyllos et al. | 714/46 |
| 5,544,310 A * | 8/1996 | Forman et al. | 714/31 |
| 5,600,789 A * | 2/1997 | Parker et al. | 714/38.11 |
| 5,634,002 A * | 5/1997 | Polk et al. | 714/38.14 |
| 5,651,111 A * | 7/1997 | McKeeman et al. | 714/38.1 |
| 5,694,540 A * | 12/1997 | Humelsine et al. | 714/38.1 |
| 5,778,169 A * | 7/1998 | Reinhardt | 714/38.1 |
| 5,781,720 A * | 7/1998 | Parker et al. | 714/38.11 |
| 5,974,254 A * | 10/1999 | Hsu | 717/109 |
| 6,002,871 A * | 12/1999 | Duggan et al. | 717/135 |
| 6,138,112 A * | 10/2000 | Slutz | 707/748 |
| 6,189,116 B1 * | 2/2001 | Mongan et al. | 714/38.14 |
| 6,298,317 B1 * | 10/2001 | Wiemann | 703/22 |
| 6,332,211 B1 * | 12/2001 | Pavela | 717/130 |
| 6,530,039 B1 * | 3/2003 | Yang | 714/38.13 |
| 6,620,204 B1 * | 9/2003 | Malcolm | 715/209 |
| 6,694,509 B1 * | 2/2004 | Stoval et al. | 717/124 |
| 6,698,012 B1 * | 2/2004 | Kossatchev et al. | 717/126 |
| 6,757,889 B1 * | 6/2004 | Ito | 717/112 |
| 6,769,115 B1 * | 7/2004 | Oldman | 717/126 |
| 6,862,696 B1 * | 3/2005 | Voas et al. | 714/38.11 |
| 6,865,731 B2 * | 3/2005 | Davia et al. | 717/127 |
| 6,898,764 B2 | 5/2005 | Kemp | |
| 6,907,546 B1 * | 6/2005 | Haswell et al. | 714/38.11 |
| 6,934,934 B1 * | 8/2005 | Osborne et al. | 717/126 |

(Continued)

OTHER PUBLICATIONS

T. Nivas, Test harness and script design principles for automated testing of non-GUI or web based applications, Jul. 2011, 8 pages.*

(Continued)

*Primary Examiner* — Thuy Dao
(74) *Attorney, Agent, or Firm* — Ference & Associates LLC

(57) ABSTRACT

In software development, the provision of a testing tool which includes a method for defining a data source dynamically during an execution run, instead of programming such a definition within test script.

15 Claims, 4 Drawing Sheets

(56) References Cited

U.S. PATENT DOCUMENTS

| | | | |
|---|---|---|---|
| 6,993,748 B2* | 1/2006 | Schaefer | 717/124 |
| 7,055,067 B2* | 5/2006 | DiJoseph | 714/38.1 |
| 7,093,238 B2* | 8/2006 | Givoni et al. | 717/129 |
| 7,174,541 B2* | 2/2007 | Muller et al. | 717/124 |
| 7,222,265 B1* | 5/2007 | LeSuer et al. | 714/38.1 |
| 7,296,188 B2* | 11/2007 | Paternostro | G06F 11/3684 714/38.14 |
| 7,373,636 B2* | 5/2008 | Barry et al. | 717/124 |
| 7,379,600 B2* | 5/2008 | Derks et al. | 382/218 |
| 7,392,509 B2* | 6/2008 | Sinha et al. | 717/126 |
| 7,614,043 B2* | 11/2009 | Ognev et al. | 717/126 |
| 7,673,292 B2* | 3/2010 | Vikram | G06F 11/3684 714/38.14 |
| 7,934,201 B2* | 4/2011 | Sweis | G06F 8/74 717/124 |
| 8,078,916 B2* | 12/2011 | Sluiman | G06F 11/28 714/26 |
| 8,539,282 B1* | 9/2013 | Kabanov | G06F 11/3688 702/182 |
| 8,739,131 B2* | 5/2014 | Gyure | G06F 11/3688 717/121 |
| 9,098,632 B2* | 8/2015 | Cook | G06F 8/38 |
| 2002/0053043 A1* | 5/2002 | Friedman et al. | 714/25 |
| 2002/0059561 A1* | 5/2002 | Foster et al. | 717/126 |
| 2003/0154468 A1* | 8/2003 | Gordon et al. | 717/143 |
| 2004/0103396 A1* | 5/2004 | Nehab | 717/127 |
| 2004/0123273 A1* | 6/2004 | Hammerich et al. | 717/126 |
| 2005/0268285 A1* | 12/2005 | Bagley | G06F 11/3688 717/124 |
| 2005/0278703 A1* | 12/2005 | Lo et al. | 717/126 |
| 2006/0136579 A1* | 6/2006 | Linville et al. | 709/223 |
| 2007/0016829 A1* | 1/2007 | Subramanian et al. | 714/38 |
| 2007/0074149 A1* | 3/2007 | Ognev et al. | 717/101 |
| 2007/0162894 A1* | 7/2007 | Noller et al. | 717/124 |
| 2008/0115111 A1* | 5/2008 | Chang et al. | 717/126 |
| 2008/0127103 A1* | 5/2008 | Bak | 717/126 |
| 2012/0174075 A1* | 7/2012 | Carteri | G06F 11/3688 717/127 |

OTHER PUBLICATIONS

Gupta et al., Model based approach to assist test case creation, execution, and maintenance for test automation, Jul. 2011, 7 pages.*

Morrison et al., Converting users to testers: an alternative approach to load test script creation, parameterization and data corellation, Nov. 2012, 9 pages.*

* cited by examiner

DATA CAPTURED DURING EXECUTION RUN R1
<ObjectContext=0xAAAAA1,
    Appearance=1,
    Enabled=True,
    FillColor=&H00000000&,
    Label=click here,
    FillStyle=1,
    Font=MS San Serif,
    Height=495,
    Width=2415,
    MouseIcon=none,
    ToolTip=Click here to proceed,
    HelpContextID=0
/>

[click here]

DATA CAPTURED DURING EXECUTION RUN R2
<ObjectContext=0xAAAAA1
    Appearance=1,
    Enabled=True,
    FillColor+&H00000000&,
    Label=Please click here,
    FillStyle=1,
    Font=MS Sans Serif,
    Height 45
    Width=2415,
    MouseIcon=none,
    ToolTip=Click here to proceed,
    HelpContextID=0
/>

[Please click here]

FIG. 2

APPLICATION OBJECT CONTEXT CAN BE DEFINED TWO DIFFERENT WAYS

AS IDs

```
<ObjectContext=ApplicationObjectIDi[0xAAAAA1]
/>
```

AS COMPLETE ACCESS PATH

```
<ObjectContext=window[Title=Welcome]->Menu[Tools,options]->window[Title=Options]
/>
```

FIG. 4

DATA-DRIVEN TESTING WITHOUT DATA CONFIGURATION

BACKGROUND

In software application development, changes in a UI (user interface) are generally considered to be inevitable. This also proves to be a significant challenge for any testing team, since whenever UI changes then a test case almost certainly will fail. As a result, the tester will need to update a verification point in accordance with the UI changes in order to promote a pass of the test down the road.

SUMMARY

Broadly contemplated herein, in accordance with at least one embodiment of the present invention, is the provision of a testing tool which includes a method for defining a data source dynamically during an execution run, instead of programming such a definition within test script.

In summary, this disclosure describes a method comprising: accepting software; and testing the software; the testing comprising: creating a verification point; storing reference data in the verification point; and subsequently employing the reference data in validating the software.

This disclosure also describes an apparatus comprising: a main memory; a software testing arrangement in communication with the main memory; the software testing arrangement acting to: create a verification point; store reference data in the verification point; and subsequently employ the reference data in validating software.

Furthermore, this disclosure also describes a program storage device readable by machine, tangibly embodying a program of instructions executable by the machine to perform a method comprising: accepting software; and testing the software; the testing comprising: creating a verification point; storing reference data in the verification point; and subsequently employing the reference data in validating the software.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 2 shows one of several ways of capturing data for UI objects (in XML format).

FIG. 4 shows two embodiments in which the application context may be captured for creating a unique handle to one or more objects.

DETAILED DESCRIPTION

Figure 1:
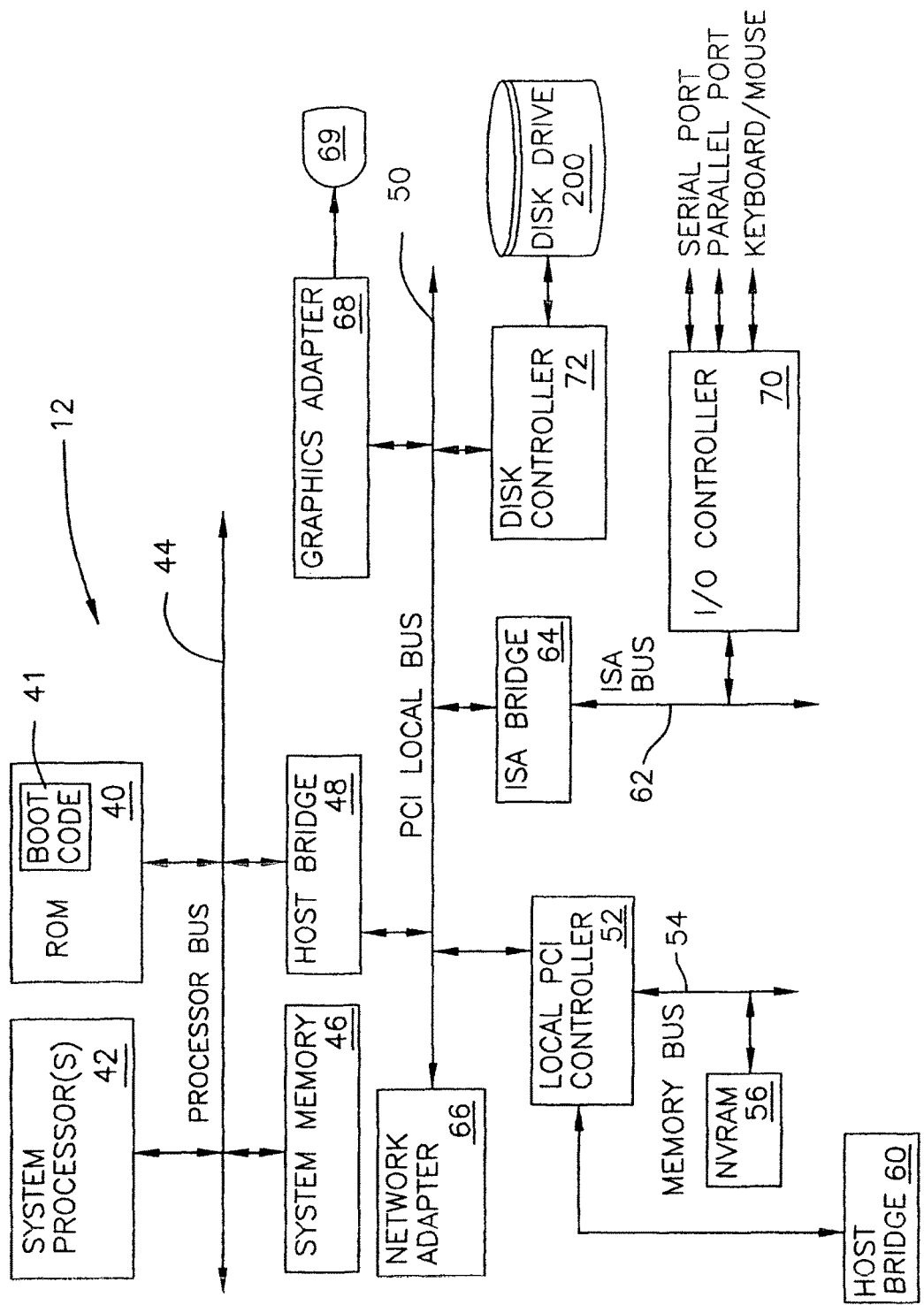
FIG. 1 schematically illustrates a computer system.

It will be readily understood that the components of the present invention, as generally described and illustrated in the Figure herein, may be arranged and designed in a wide variety of different configurations. Thus, the following more detailed description of the embodiments of the apparatus, system, and method of the present invention, as represented in FIG. 1, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that embodiment of the invention can be practiced without one or more of the specific details, or with other methods, components, materials, etc. In other instances, well-known structures, materials, or operations are not shown or described in detail to avoid obscuring aspects of embodiments of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Referring now to FIG. 1, there is depicted a block diagram of an illustrative embodiment of a computer system 12, which may be employed in accordance with one or more embodiments of the present invention. It is to be understood that the system 12 shown in FIG. 1 is provided by way of an illustrative and non-restrictive example, and that of course other types of computer systems can be employed with the embodiments of the present invention set forth herein.

The embodiment depicted in FIG. 1 may be a notebook computer system, such as one of the ThinkPad® series of personal computers previously sold by the International Business Machines Corporation of Armonk, N.Y., and now sold by Lenovo (US) Inc. of Morrisville, N.C.; however, as will become apparent from the following description, the embodiments of the invention may be applicable to any data processing system. Notebook computers, as may be generally referred to or understood herein, may also alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

It should be understood that system 12, as discussed and set forth with respect to FIG. 1, provides but an illustrative and non-restrictive example of a system that can be employed in connection with at least one embodiment of the present invention. The disclosure now turns to a discussion of embodiments of the present invention that can readily make use of a system such as system 12, or of a different or analogous system. The actions described herebelow can be carried out in essentially any suitable medium, such as the system processor 42 indicated at 42 in FIG. 1.

In the context of the challenges and problems discussed heretofore, there is broadly contemplated herein, in accordance with at least one embodiment of the present invention, an arrangement whereby upon the creation of a verification point (VP), it will not be checked against a predetermined or pre-configured VP (whether this would be image or VP data). Preferably, there will in fact be no pre-configured data source at all. Instead, a verification point reference, to be discussed more fully below, will preferably be utilized.

Figure 3:
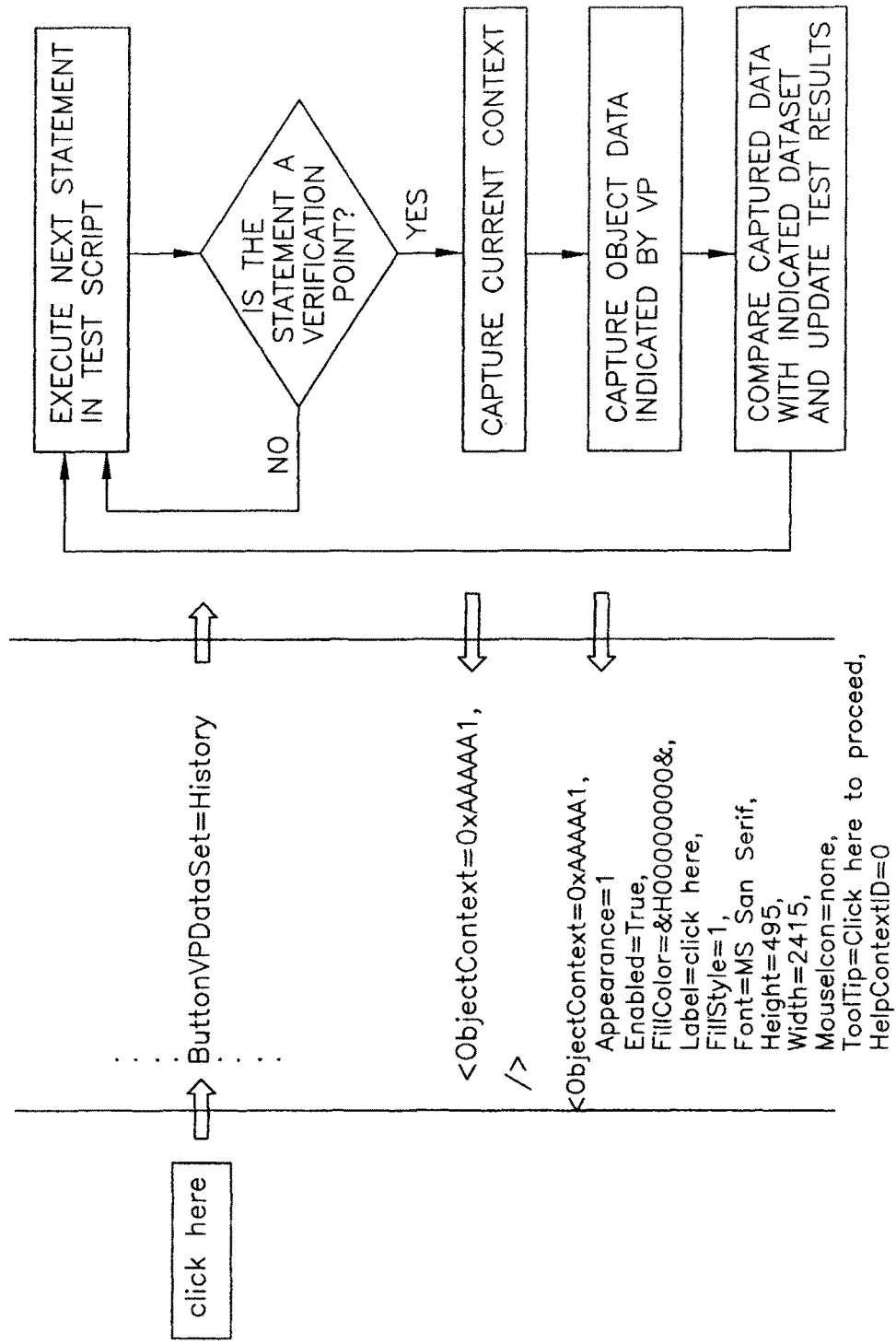
FIG. 3 shows a flow of events for executing a process in accordance with an embodiment of the present invention

Throughout the ensuing discussion, reference can continue to be made not only to FIG. 1 but also to FIGS. 2-4.

Accordingly, FIG. 2 shows one of several ways of capturing data for UI objects (in XML format). The upper half of FIG. 2 conveys, by way of illustrative and non-restrictive example, data that are captured during two execution runs that may be referred to as "Run R1" and "Run R2", respectively. It can be seen in FIG. 2, as will be further appreciated from the discussion herebelow, that different labels as presented to the user ("click here", "Please click here") can be employed without difficulty.

FIG. 3 shows a flow of events for executing a process in accordance with an embodiment of the present invention. This process will be better appreciated from the discussion herebelow, wherein responsive to a user prompt (e.g., "click here", a "verification point reference" is set, followed by a general process for data capture (the flowchart at the right of the Figure) which then yields an output in the form of an object context.

FIG. 4 shows two embodiments in which the application context may be captured for creating a unique handle to one or more objects. The first embodiment is conveyed in the form of defining an application object context as ID's and the second is conveyed in the form of defining an application object context as a complete access path. Both of these definitions of an application object context will be further appreciated from the discussion herebelow.

Generally, in accordance with an embodiment of the present invention, a "verification point reference" is a data set which will be used for storing reference data for the purpose of validating a test case. For example, a VP can be created for a button label as: ButtonVP "Label=click here; width=100; height=50; coordinate=100, 200". Consequently, if (for instance) the label were to change to "Please click here", a tester needs to update all scripts where the original label is written, or at least update the test data store if the values ("click here", 100, 50, "100, 200") are picked from a data store. This can be appreciated from FIG. 2, where two different labels are employed for different execution runs R1 and R2.

In accordance with an embodiment of the present invention, and as shown in FIG. 3, the VP declaration may be modified as:

ButtonVP "DataSet=History"

The interpretation of history now becomes, "Data captured during Last/Previous run of the script" If the last/previous run is considered to be run "R1", then in accordance with the VP modification just mentioned, if the label changes then it will be the case that during execution (run "R2" for the purposes of illustration) the VP will fail. When a testing suite runs at a subsequent time (run "R3"), the dataset will be set at "history", meaning that the data store to be employed will be the same as that captured during execution of run R2. As such, test scripts will not fail from run R3 onwards, while not a single line of script will have needed to be changed.

Another benefit of the concept presented hereinabove is enjoyed in connection with finding all UI changes between two builds or versions of software. This can be done simply by pointing the "verification point reference" from "history" to any of the previous execution runs. For example, consider the release of an initial product (e.g., version 1.0.0.0), wherein the last test execution was "R100". After release of the product, work for the next release starts. When this next version of the application (e.g., version 1.0.0.1) is ready with last execution run named "R200", it is possible to find all UI changes between the two versions (1.0.0.0 and 1.0.0.1), simply by executing all test scripts on version 1.0.0.1 and pointing the VP dataset to R100 (which corresponds to 1.0.0.0). To make is easy for users to remember and use historical data references, execution run names can be annotated to more meaningful labels; for example, in the case just discussed, R100 can be annotated/labeled as "Release1.0.0.0", R200 as "Release1.0.0.1", etc.

It will be appreciated that by way of stark contrast, conventionally it is not known to directly find UI changes between two builds/versions of software, other than by reading all product documentation or going thru all "changeRequests" for a given product.

By way of an illustrative and non-restrictive example, a product manager may be interested to learn of all UI changes between versions "iFix3" and "iFix1". This can be achieved simply by executing the test suite on iFix3 with a "verification point reference" to iFix1's final test execution run.

To elaborate further, conventionally, when VPs are defined, reference data is either stored in the script itself (or is tightly integrated with test script) and data captured during the application's running instance is compared with the saved VP data; thereupon a "pass" or "fail" is determined. By way of contrast, in accordance with at least one preferred embodiment of the present invention, it will be appreciated that, first, data is not stored with script; it merely has a "DataSet" reference name/label. Secondly, entire data which is fetched from the application during runtime for comparison is stored and thereafter referred to as a execution run (such as R100, R200 or "Release1.0.0.1" as discussed above). In other words, execution runs (e.g., R100, R200, etc.) essentially convey the state of an application during an execution run. Once execution run data are captured, then the application can be compared with any of the previous execution runs by simply changing the "DataSet" reference so that it points to any desired historical value.

To further appreciate the embodiments of the present invention, it will be appreciated that conventionally verification points are not kept for all objects in an application under test. This means that application is actually not tested completely. In accordance with embodiments of the present invention, however, one can simply apply VP for a particular type (e.g., "ButtonVP") that will capture all buttons in a current context. If there are too many buttons to capture, then a filter can be defined to narrow down the data capture scope, e.g.:

ButtonVP DataSet=Release1.0.0.1 filer=[label=cancel]

Accordingly, a filter such as the above will ensure that all buttons in a current context with the label "cancel" will not be compared and, therefore, will not be reported in the test report. Wild cards can be used to specify certain classes of labels/properties (e.g., [label=*next*] can cover string labels like "click next", "next >>", "please click next" etc.)

In brief recapitulation, the following are among the very many advantages that can be attained by employing a process, in accordance with at least one embodiment of the present invention, as set forth and broadly contemplated herein:

No data store definition is required for UI (this is captured automatically on runtime which is never incorrect).
No script changes are needed whenever UI changes.
A manner is provided for finding all UI changes between any two builds/versions of the software in question.

It is to be understood that the present invention, in accordance with at least one embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

Generally, embodiments may take the form of an entirely hardware embodiment, an entirely software embodiment or an embodiment containing both hardware and software elements. An embodiment that is implemented in software may include, but is not limited to, firmware, resident software, microcode, etc.

Furthermore, embodiments may take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system, (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure for various embodiments with various modifications as are suited to the particular use contemplated.

Generally, although illustrative embodiments of the present invention have been described herein with reference to the accompanying drawings, it is to be understood that the invention is not limited to those precise embodiments.

What is claimed is:

1. A method of testing software, said method comprising:
running a test of software, via executing a test script;
dynamically creating a verification point during said running of the test;
wherein said creating of a verification point comprises leaving the test script intact;
wherein said creating of a verification point comprises including a filter to narrow a scope of data capture and thereby reducing a size of a test report;
storing reference data in the verification point; and
subsequently employing the verification point and reference data in running at least one additional test of the software via executing the text script, while leaving the test script intact;
wherein the verification point comprises a statement for yielding output in the form of an object context.

2. The method according to claim 1, wherein said test script is immune to user interface changes between tests.

3. The method according to claim 1, wherein said storing comprises modifying the verification point.

4. The method according to claim 3, wherein said modifying comprises including a reference to historical data in the verification point.

5. The method according to claim 4, further comprising employing the verification point to refer to historical changes between product versions.

6. The method according to claim 5, wherein said employing comprises employing the verification point to refer to historical changes between two product versions that are earlier versions than a current product version.

7. An apparatus comprising:
a main memory;
a software testing arrangement in communication with said main memory;
said software testing arrangement acting to:
- run a test of software, via executing a test script;
- dynamically create a verification point during said miming of the test;
- wherein to create a verification point comprises leaving the test script intact;
- wherein to create a verification point comprises including a filter to narrow a scope of data capture and thereby reducing a size of a test report;
- store reference data in the verification point; and
- subsequently employ the verification point and reference data in running at least one additional test of the software via executing the text script, while leaving the test script intact;
- wherein the verification point comprises a statement for yielding output in the form of an object context.

8. The apparatus according to claim 7, wherein said test script is immune to user interface changes between tests.

9. The apparatus according to claim 7, wherein storing reference data in the verification point comprises modifying the verification point.

10. The apparatus according to claim 9, wherein said software testing arrangement acts to modify the verification point via including a reference to historical data in the verification point.

11. The apparatus according to claim 10, wherein said software testing arrangement further acts to employ the verification point to refer to historical changes between product versions.

12. The apparatus according to claim 11, wherein said software testing arrangement acts to employ the verification point to refer to historical changes between two product versions that are earlier versions than a current product version.

13. A program storage device readable by machine, tangibly embodying a program of instructions executable by the machine to perform a method comprising:
accepting software; and
testing the software;
said testing comprising:
- running a test of software, via executing a test script;
- dynamically creating a verification point during said running of the test;
- wherein said creating of a verification point comprises leaving the test script intact;
- wherein said creating of a verification point comprises including a filter to narrow a scope of data capture and thereby reducing a size of a test report;
- storing reference data in the verification point; and
- subsequently employing the verification point and reference data in running at least one additional test of the software via executing the test script, while leaving the test script intact;
- wherein the verification point comprises a statement for yielding output in the form of an object context.

14. The program storage device according to claim 13, wherein said test script is immune to user interface changes between tests.

15. The program storage device according to claim 13, wherein said storing comprises modifying the verification point.

* * * * *